Patented Sept. 28, 1937

2,094,314

UNITED STATES PATENT OFFICE 2,094,314

METHOD OF PRODUCING A FOOD PRODUCT

Dudley Howard Wiggins, Indianapolis, Ind.

No Drawing. Application August 14, 1935,
Serial No. 36,133

4 Claims. (Cl. 99—199)

According to present knowledge, many of the grasses, such as blue grass, wheat, oats, rye, when immature have vitamin contents exceeding that of spinach but are not acceptable for human consumption.

It is also understood that many human stomachs are in such condition that vitamin bearing comestibles passing therethrough have their vitamin contents so changed that, during subsequent passage through the intestines, vitamin contribution to nutrition is very small.

It is also known that ordinary methods of curing immature leaves, as by desiccation, are destructive of vitamin content and render such leaves even more unacceptable as diet for humans.

An object of my present invention is to produce from immature leaves of grass, or other vitamin-containing leaves, or vitamin-containing roots, a dehydrated powder which will be acceptable to humans as a comestible and wherein all, or nearly all, of the natural vitamin content will be retained and will be so protected that it will pass through the human stomach without substantial vitamin loss and will be in such condition upon arrival in the intestines that the vitamin content may be readily absorbed.

Another object of my invention is to provide an improved method of dehydration of immature leaves and vegetables by which the above-mentioned new foods may be successfully produced, the ultimate powder product being of such character as to be stable, under ordinary atmospheric conditions, during extended periods.

While my invention relates primarily to the fresh green immature leaves of grasses, such as rye, oats, wheat or blue-grass (preferably before jointing) and to edible fresh green leaves of spinach and other similar plants, it is also applicable to many fresh edible roots such as carrots.

A typical procedure is as follows:

Freshly harvested green, immature, grass leaves, having been first washed in fresh or saline water to remove all grit, are soaked in fresh skimmed cow's milk (preferably containing a small quantity of common salt). By the time the leaves can be brought to this first milk bath there has inevitably been a small amount of surface dehydration by natural evaporation and the leaves should remain in the milk bath long enough to absorb as much of the milk as possible. The milk penetration, at this time, will be quite shallow but will be sufficient to provide an initial protective impregnation of casein.

The milk soaked leaves are then partially dehydrated by any well known method although preferably under a vacuum. This dehydration should be carried to a point where the material is in condition, when again subjected to a milk bath, to readily absorb an additional quantity of milk, the casein content penetrating still further into the structure of the leaves and the leaves bloating to about normal dimensions. If dehydration is carried too far the rate of subsequent milk-absorption will be greatly retarded and casein penetration will be obstructed. My present knowledge indicates that partial dehydration should extract somewhere in the neighborhood of 25% of the total water content. Following the second impregnation of milk, the leaves are again partially dehydrated. Repeated milk soaking, and preceding partial dehydrations (about four or five impregnations) result in a substantially complete impregnation of casein, whereupon there is a final dehydration to a point where the product is substantially dry so as to inhibit mould.

During the dehydration steps the material tends to cake and preceding each milk impregnation after the first it is desirable to reduce the caking to particles less than small pea size to facilitate milk absorption.

After the final dehydration it is best to reduce the product, by grinding, to a fine powder to facilitate ingestion.

I have found it desirable, in order to lessen possibility of fermentation, to add a small quantity of common salt—about ¼ ounce per quart—to the milk.

The first milk bath may offer an excess of milk but for the subsequent impregnations the volume of milk should be preferably limited to the volume which will be absorbed by the partially dried leaves so that the material will not have a tendency to cake in too large masses.

I have found by trial that satisfactory results are attained with 2 lbs. of milk per 10 lbs. of partially desiccated leaves.

I have found that edible roots, such as carrots, may be similarly treated to produce a food product in which the vitamin content is casein-protected, if the fresh root be finely chopped or thinly sliced and milk treated as described. A vitamin containing grass, root, or leaf, when treated as described evolves into a readily ingestible food, pleasurably ingestible with sugar and cream, lacking in unpleasant odor; possessing a color but little changed from its natural color, and having practically all of its natural vitamin content so protected against the action of the juices in the human stomach that it arrives in the intestines with a substantially unchanged vitamin content.

Each partial drying extracts part of the original water content and part of the water of the milk but leaves the material in condition to readily absorb the next charge of milk in such manner that the casein successively penetrates deeper and deeper into the cellular structure of the material under such conditions that no relatively thick external layer of casein is formed on the particles until the final drying is accomplished.

The total casein impregnation should be sufficient to protectively coat the vitamin content and to this end my present knowledge indicates that the final product should contain as much as 10% casein but the casein content may be considerably greater, even to somewhere in the neighborhood of 50% of the total weight of the finished product.

The principal point to be borne in mind is that there should be a complete impregnation by the casein and that the desirable impregnation apparently cannot be accomplished except by several successive alternate partial dehydrations and impregnations. The thickness of casein film in the interstices of the mechanical structure of the material may vary within fairly wide limits (thereby varying the percentage of casein content in the finished product) but the extent of casein impregnation should be substantially complete.

In order to further stabilize the final product, produced as described above, I mechanically mix with the powder a very small quantity of melted hydrogenated vegetable oil, such as "Crisco", the quantity being just sufficient to be completely absorbed so that at atmospheric temperatures, there is no greasiness to taste or touch. I have found that about ½ ounce of such oil per pound of powder gives satisfactory results as a protection against oxidation of the finished product.

I claim as my invention:

1. The method of producing a comestible from fresh immature vitamin-containing leaves of grass or plants which comprises an initial partial impregnation of milk; a partial dehydration of the milk-impregnated material to a point where deeper milk-impregnation will be facilitated but not inhibited; and subsequent alternate milk impregnations of the character specified and partial dehydrations of the character specified until the natural water content has been replaced by casein to a degree below that sufficient to permit bacterial development under normal atmospheric conditions.

2. The method of producing a comestible from any one of the vegetable group comprising fresh immature vitamin-containing leaves and roots which comprises an initial partial impregnation of milk; a partial dehydration of the milk-impregnated material to a point where deeper milk-impregnation will be facilitated but not inhibited; and subsequent alternate milk impregnations of the character specified and partial dehydrations of the character specified until the natural water content has been replaced by casein to a degree below that sufficient to permit bacterial development under normal atmospheric conditions.

3. The method described in claim 1 plus the admixture to the finally dehydrated material of an absorbable quantity of hydrogenated vegetable oil.

4. The method described in claim 2 plus the admixture to the finally dehydrated material of an absorbable quantity of hydrogenated vegetable oil.

DUDLEY HOWARD WIGGINS.